(12) United States Patent
Pils et al.

(10) Patent No.: US 10,570,918 B2
(45) Date of Patent: Feb. 25, 2020

(54) FAN HAVING OUTER ELECTRONICS

(71) Applicant: ebm-papst Mulfingen GmbH & Co. KG, Mulfingen (DE)

(72) Inventors: Malte Pils, Ilshofen-Oberaspach (DE); Thomas Heli, Langenburg (DE); Peter Riegler, Boxberg (DE); Jörg Günther, Dörzbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 144 days.

(21) Appl. No.: 15/574,869

(22) PCT Filed: Jul. 18, 2016

(86) PCT No.: PCT/EP2016/067016
§ 371 (c)(1),
(2) Date: Nov. 17, 2017

(87) PCT Pub. No.: WO2017/016912
PCT Pub. Date: Feb. 2, 2017

(65) Prior Publication Data
US 2018/0128285 A1    May 10, 2018

(30) Foreign Application Priority Data

Jul. 24, 2015  (DE) ........................ 10 2015 112 106

(51) Int. Cl.
| | |
|---|---|
| *F04D 29/42* | (2006.01) |
| *F04D 25/06* | (2006.01) |
| *F04D 25/08* | (2006.01) |
| *F04D 29/62* | (2006.01) |
| *H02K 11/33* | (2016.01) |
| *H02K 5/22* | (2006.01) |
| *H02K 1/32* | (2006.01) |

(52) U.S. Cl.
CPC ....... *F04D 29/4226* (2013.01); *F04D 25/068* (2013.01); *F04D 25/082* (2013.01);
(Continued)

(58) Field of Classification Search
CPC .. F04D 25/082; F04D 25/068; F04D 25/0613; F04D 29/626; F04D 29/4226;
(Continued)

(56) References Cited

U.S. PATENT DOCUMENTS 4,529,900 A * 7/1985 Uzuka ................. H02K 7/20
                                            310/266
5,969,445 A * 10/1999 Horiuchi ............. H02K 11/40
                                            310/64
(Continued)

FOREIGN PATENT DOCUMENTS

| DE | 19630616 A1 | 1/1997 |
|---|---|---|
| DE | 102010012392 A1 | 9/2011 |

(Continued)

OTHER PUBLICATIONS

International Search Report (in German with English Translation) for PCT/EP2016/067016, dated Sep. 26, 2016; ISA/EP.

*Primary Examiner* — Igor Kershteyn
(74) *Attorney, Agent, or Firm* — Harness, Dickey & Pierce, P.L.C.

(57) ABSTRACT

A fan includes a fan housing and a motor accommodated therein. The motor has a stator and a rotor, which is connected to a fan wheel. The fan housing consists of at least a housing upper part and a housing lower part. The housing upper part has an axial opening on the axial inner face of which facing the housing lower part the stator is arranged. On the axial outer face of the axial opening at least electronics are arranged.

15 Claims, 3 Drawing Sheets

(52) U.S. Cl.
CPC .......... *F04D 29/626* (2013.01); *H02K 5/225* (2013.01); *H02K 11/33* (2016.01); *F04D 25/0613* (2013.01); *H02K 1/32* (2013.01); *H02K 2213/03* (2013.01)

(58) Field of Classification Search
CPC .......... H02K 1/32; H02K 5/225; H02K 11/33; H02K 2213/03
See application file for complete search history.

(56) References Cited

U.S. PATENT DOCUMENTS

| | | | | |
|---|---|---|---|---|
| 6,297,572 B1 * | 10/2001 | Sunaga | ................. | H02K 11/33 310/64 |
| 6,661,134 B2 * | 12/2003 | Sunaga | ................. | H02K 11/33 310/64 |
| 6,762,521 B2 * | 7/2004 | Peter | ..................... | H02K 1/187 310/43 |
| 7,227,287 B2 * | 6/2007 | Noda | ................... | F04D 25/082 310/68 R |
| 9,022,753 B2 * | 5/2015 | Streng | ................. | F04D 25/082 417/366 |
| 2001/0036409 A1 * | 11/2001 | Murata | .................... | A47L 5/22 417/32 |
| 2011/0229358 A1 | 9/2011 | Streng et al. | | |

FOREIGN PATENT DOCUMENTS

| | | | |
|---|---|---|---|
| EP | 1079502 A1 | 2/2001 | |
| JP | 2003172300 A | 6/2003 | |

\* cited by examiner

FAN HAVING OUTER ELECTRONICS

CROSS REFERENCE TO RELATED APPLICATIONS

This application is a U.S. National Phase Application under 35 U.S.C. 371 of International Application No. PCT/EP2016/067016 filed on Jul. 18, 2016 and published in German as WO 2017/016912 A1 on Feb. 2, 2017. This application claims priority to German Application No. 10 2015 112 106.9 filed on Jul. 24, 2015. The entire disclosures of all of the above applications are incorporated herein by reference.

FIELD

The disclosure relates to a fan and a motor accommodated therein having a stator and a rotor, which is connected to a fan wheel, wherein the fan housing is formed of at least a housing upper part and a housing lower part.

BACKGROUND

A motor with an integrated motor control electronics is typically used for fans driven by electronically commutated motors. The motor control electronics are regularly accommodated in an electronics housing that is directly adjoining the motor structure. The disadvantage here is that replacement of the motor control electronics in a service case is either not possible or requires a considerable assembling effort.

The electronics housing has a sealed design when it is directly inserted between the motor and the motor control electronics, since it is disposed inside the medium delivered by the fan. The options for cooling the motor control electronics are therefore very limited.

Furthermore, a design with a motor and an adjoining electronics housing in which the motor control electronics are accommodated and connected entails that more space is required inside the fan housing.

In addition, stators press-coated with a synthetic material, which are favorable for application here, can only be produced in small installation sizes with a relatively small diameter, which limits the size of the circuit board for electronics and the number of electronic components that can be provided.

A fan representing prior art is known, for example, from patent application DE 10 2010 012 392 A1.

It is therefore a problem of the disclosure to provide a fan that has smaller axial installation space requirements for integrating motor and motor electronics into the fan housing and provides access for replacing the electronics when service is needed.

SUMMARY

According to the disclosure, a fan is proposed comprising a fan housing formed by at least a housing upper part and a housing lower part, and a motor with a stator and a rotor accommodated therein, which is connected to a fan wheel. The housing upper part further comprises an axial opening, wherein the stator is disposed on the axial inner side of said opening that faces the housing lower part, and at least one electronics unit is disposed on the axial outer side of said opening. The axial direction is defined as an extension parallel to the motor axis or fan axis.

The motor particularly is an electronically commutated external rotor motor having a stator press-coated with a synthetic material which is located inside the fan housing within the medium to be delivered and drives the fan wheel. The electronics are preferably mounted onto a circuit board that extends perpendicular to the axial direction.

According to the disclosure, the stator and the electronics are attached on two axial sides of the housing upper part, the electronics on the axial outer side, the stator on the axial inner side that faces the housing lower part. The wall of the housing upper part separates the electronics from the stator, but the axial opening in the housing upper part provides a direct connection option to the stator. When the electronics are disposed outside the housing upper part, that is, outside the fan housing and thus outside the medium to be delivered by the fan, the need to use a sealed electronics housing is eliminated. In addition, the electronics can be accessed and replaced from the outer side of the fan housing without having to disassemble the fan.

In an advantageous embodiment, the electronics are motor control electronics for the electronically commuted drive of a motor or an integrated unit of motor control electronics and adjacent electronics for supplying external consumers. The electronics for supplying external consumers include functions for operating an external consumer, particularly an output for voltage supply to an external consumer and an input for communication with the external consumer. The connection option of the electronics to supply other external consumers is made possible by attaching the electronics on the axially outer side to the housing upper part and the associated accessibility from outside.

In the embodiment according to the disclosure, it is further favorable that the housing upper part forms part of the electronics housing, such that there is no need for providing an extra electronics housing. The axial installation space required for the electronics housing is saved because it is partially provided by the housing upper part itself. In addition, using the housing upper part as electronics housing allows an increase in diameter of the electronics or the circuit board and a flatter axial design of the electronic circuitry.

Furthermore, an embodiment is advantageous in which the motor control electronics are connected wirelessly and detachably to the stator through the axial opening of the housing upper part. Direct and wireless connection, for example via contact pins, of the motor control electronics unit to the stator has the advantage that sensors on the electronics can sense the heating up of windings directly and eliminating interference takes less effort, since no additional connecting lines are required.

In an advantageous embodiment, the stator comprises a connecting ring via which it can be attached axially and/or radially resting against a circumferential edge of the axial opening. The axial opening can thus be used for connecting the stator disposed on the inner side relative to the housing upper part and the electronics disposed on the outer side relative to the housing upper part, while the stator is mounted via the connecting ring to the circumferential edge of the axial opening.

Furthermore, an embodiment of the fan is advantageous in which the connecting ring has a circumferential step which represents an axial contact surface and a radial contact surface for engaging the edge of the axial opening. Furthermore, a support surface is formed parallel to the extension of the axial opening to which the electronics can be directly attached. The support surface preferably extends radially inwards relative to the step on the connecting ring.

The support surface is preferably flat, such that the electronics mounted onto the circuit board can be arranged in parallel. In addition, said step is configured such that the support surface of the connecting ring is flush with a radially adjoining surface of the housing upper part. The axial and radial contact surfaces of the connecting ring allow fitting the connecting ring to the circumferential edge of the axial opening, such that the axial contact surface rests flat against the axially inner side of the wall of the housing upper part and the radial contact surface rests flat against the radially inner side of the wall of the axial opening of the housing upper part. Sections of the connecting ring and the stator connected to it project into the axial opening in this embodiment.

In another advantageous embodiment, the disclosure is characterized in that the housing upper part has a central section that is inwardly recessed in the axial direction like a pot and inside which the axial opening is provided and the electronics are disposed. The recessed central section is substantially centered in the housing upper part, wherein the shape of the fan housing in the radially adjoining outer edge region can be of any design based on the fluidic requirements, for example, helical. In a favorable embodiment, the electronics unit is fully accommodated in the axial and radial directions in the recessed central section, such that the housing upper part forms both the bottom face and the side walls of the electronics housing. The electronics are thus protected and do not project axially from the fan housing.

It is preferred that a plate is disposed on the housing upper part to cover the electronics, which plate is dimensioned such that it covers at least the recessed central section. The plate, as a type of lid, and the housing upper part together form the electronics housing that completely encloses the electronics.

For better dissipation of the heat generated by the electronics unit, at least sections of the plate have an axially embossed contour in the direction of the electronics unit which is thermally coupled to the electronics. Heat conduction pads can additionally be provided on the embossed contour of the plate or the adjoining electronics to improve thermal conductivity.

It is further advantageous if the electronics unit is not completely sealed from the environment and air can circulate at the electronics components or along the circuit board. In one embodiment, the plate is therefore provided with ventilation openings. The ventilation openings are preferably distributed circumferentially on the outer edge of the plate.

A preferred size ratio of the diameter B of the plate to the diameter D of the circuit board is determined as B/D>1.5 to maximize the quantity of heat that can be dissipated from the electronics. The plate preferably extends in the radial direction beyond the recessed central section.

The plate is preferably made of metal to reduce stray RF radiation and to improve electromagnetic protection (EMV protection). The fan housing is for example made by die casting or of a synthetic material.

In a further development, the fan further comprises a seal disposed between the stator and the housing upper part, which hermetically separates the electronics from a medium delivered inside the fan housing. The electronics thus have no contact with the medium delivered by the fan.

It is further favorable that the housing upper part is designed in one piece and that the housing upper part and the housing lower part can be attached to one another via a groove-and-tongue connection. It is also preferred that a seal is provided in the groove-and-tongue connection between the housing upper part and the housing lower part.

It is advantageous with respect to the design that the maximum diameter D of the circuit board is greater than the maximum diameter d of the connecting ring, such that sufficient installation space for the plurality of electronic components is provided. This is made possible by arranging the electronics outside the housing upper part and thus outside the entire fan housing.

Other advantageous further developments of the disclosure are characterized in the dependent claims or are explained in more detail below with reference to the figures and together with a preferred embodiment of the invention.

DRAWINGS

DESCRIPTION

Like reference symbols identify like components in all views.

Figure 1:
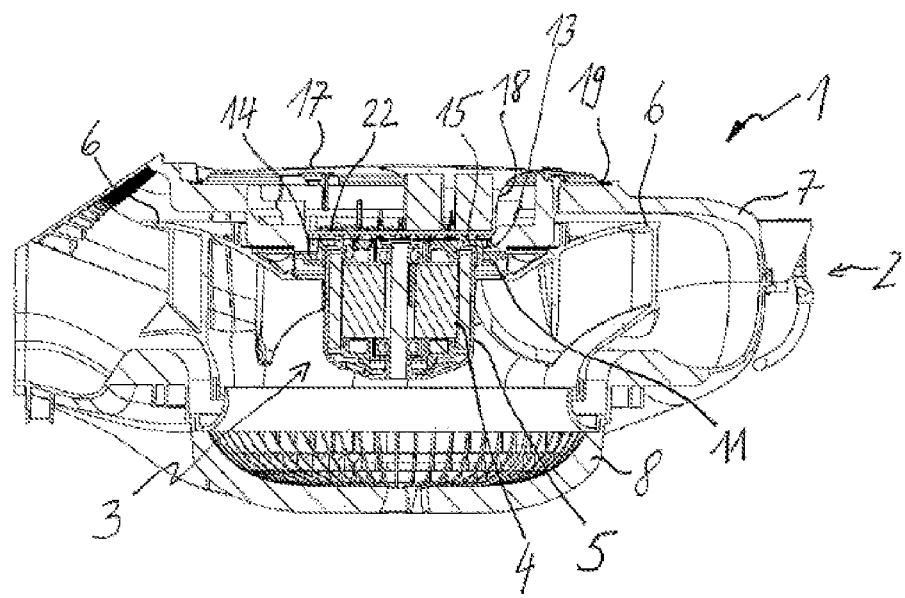
FIG. 1 shows a lateral sectional view of a fan according to the invention.
Figure 2:
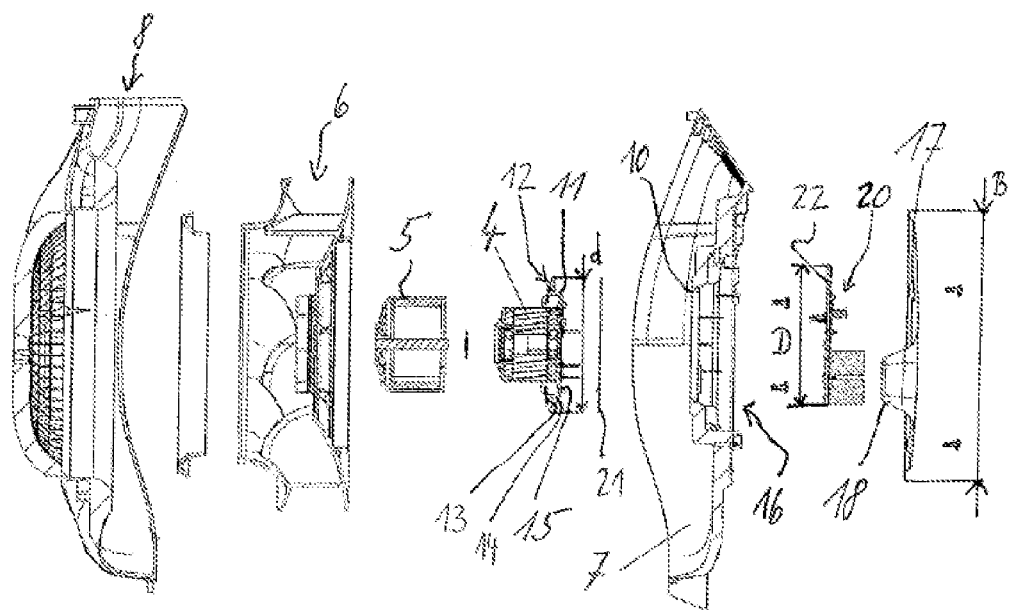
FIG. 2 shows an exploded lateral view of the fan from FIG. 1.
Figure 3:
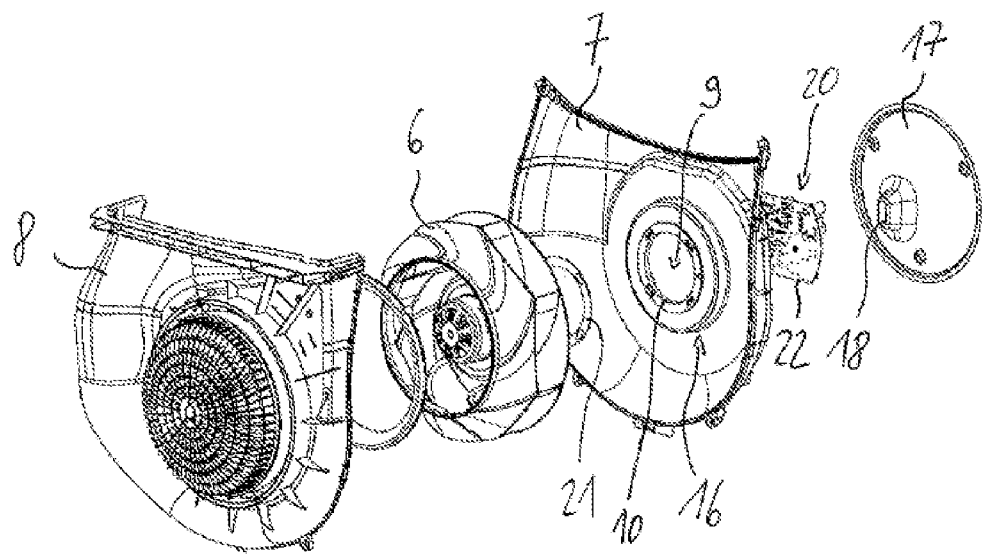
FIG. 3 shows an exploded perspective view of the fan from FIG. 1.
Figure 4:
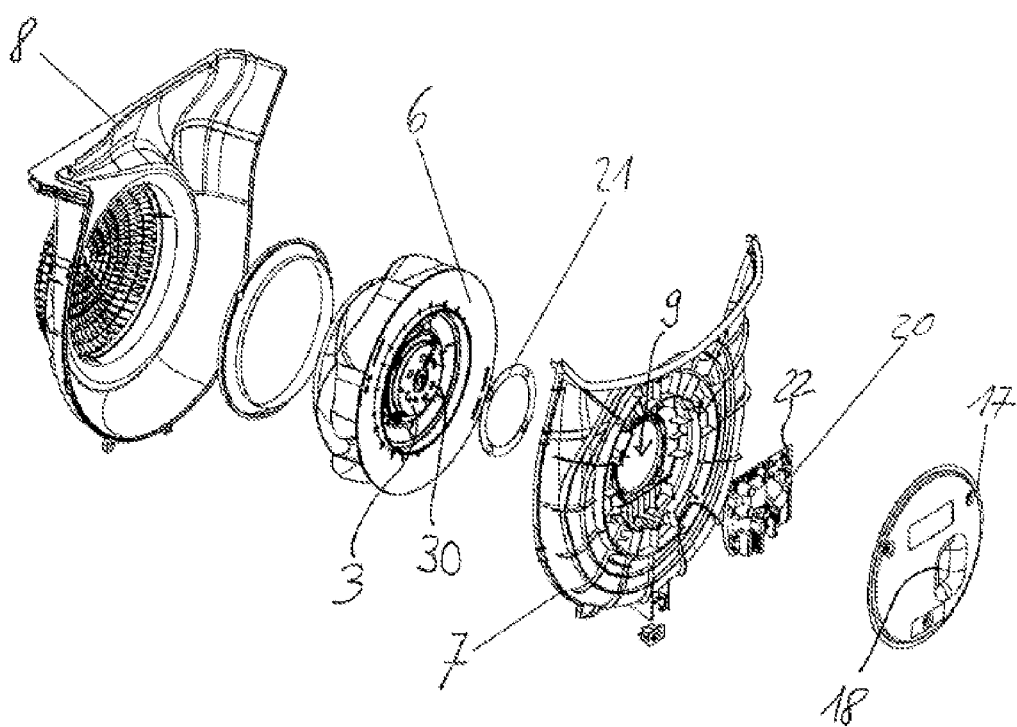
FIG. 4 shows another exploded perspective view of the fan from FIG. 1.

FIG. 1 shows a lateral sectional view of an embodiment of the fan 1 according to the disclosure. FIGS. 2 to 4 show exploded views of the same embodiment in from different angles. The description below relates to all figures.

The embodiment shown in FIGS. 1-4 is a fan 1 having a fan housing 2 formed of a housing upper part 7 and a single-piece housing lower part 8 and a motor 3 with a stator 4 and a rotor 5 accommodated therein, which is connected to the fan wheel 6. The housing upper part 7 comprises an axial opening 9, wherein the stator 4 is disposed on the axial inner side of said opening facing the housing lower part 8, and wherein at least one unit 20 that is mounted to a circuit board 22 and includes the motor control electronics and adjoining electronics for supplying one or more external consumers is disposed on the axial outer side of said opening. The housing upper part 7 has components mounted to it on both axial sides, on its one side the stator 4 and on its other side the circuit board 22. The fan housing 2 is helical and forms the pressure space around motor 3 which is centrally disposed in the interior of the fan housing 2.

The motor 3 is an external-rotor synchronous motor having a stator 4 pressure-coated with a synthetic material and outwardly enclosed by the rotor 5. The fan wheel 6 is disposed on the rotor 5 and driven by the motor 3. The motor 3 substantially extends axially over the entire axial length of the fan housing 2 in the direction of a suction area of the fan 1.

The motor 3 is commutated by the motor control electronics on the circuit board 22. Additional external consumers are not shown.

The motor control electronics are wirelessly connected to the stator 4 via contact pins 30 through the axial opening 9 of the housing upper part 7 and can be detached from the stator 4, such that the circuit board 22 can be replaced.

Figure 5:
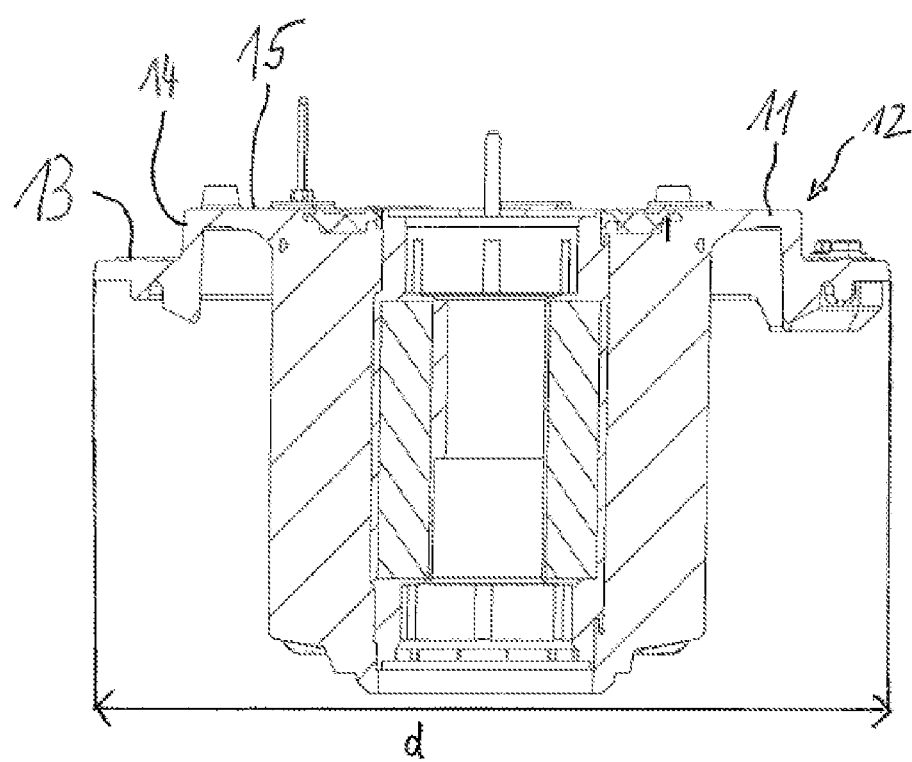
FIG. 5 shows an enlarged view of the connecting ring.

A connecting ring 11 is provided on the stator 4, by which the stator 4 is attached axially and radially resting against a circumferential edge 10 of the axial opening 9. As shown in FIG. 5, the connecting ring 11 comprises a step 12 radially outside the stator 4, such that the connecting ring 11 forms an axial contact surface 13 for resting axially against the edge 10 of the housing upper part 7 and a radial contact surface 14 for resting radially against the edge 10 of the housing upper part 7. The connecting ring 11 further includes a contact surface 15 parallel to the axial opening 9 and flush with the section of the housing upper part 7 that radially adjoins the axial opening 9 and onto which the circuit board 22 is fixed with screws.

The housing upper part 7 comprises its central section 16 that is recessed like a pot inwardly in the axial direction, that is, in the direction of the housing lower part 8, around its axial center. The axial opening 9 is provided in the bottom area of the pot-like recess. The circuit board 22 and the unit 20 of multiple electronics disposed thereon are inserted in the recessed central section 16, such that they are completely enclosed by the recessed central section 16 in the axial and radial directions. The bottom and the walls of the recessed central portion 16 form a part of the electronics housing for accommodating the circuit board 22 and the unit 20 with electronics. The electronics housing is closed by the metal plate 17 that is fixed with screws to the housing upper part 7 and completely covers the recessed central section 16 and the electronics. A single-piece contour 18 axially embossed in the direction of the circuit board 22 is formed on the plate 17 and thermally coupled with the unit 20 of electronics to dissipate heat. The contour 18 has a substantially elliptical cross section on the plate 17 and extends conically from two sides in the axial direction, such that its cross-sectional area diminishes towards the circuit board 22. Ventilation openings 19 are provided distributed along the circumferential edge of the plate 17 to allow air to circulate along the unit 20 of electronics and an exchange of air with the ambient air. The ventilation openings 19 can alternatively be distributed across the plate 17.

The housing upper part 7 is attached directly and in a sealed manner to the housing lower part 8 via a sealing ring. A seal 21 is disposed between the stator 4 and the housing upper part 7, such that the unit 20 of electronics is separated from the medium delivered inside the fan housing 2.

The size ratio shown in the embodiment of the diameter B of the plate 17 and the diameter D of the circuit board 22 is 1.9. The diameter D of the circuit board 22 is also greater than the maximum diameter d of the connecting ring 11 by a factor of 1.1.

The implementation of the disclosure is not limited to the preferred embodiments described above. Instead, a plurality of variants is conceivable in which the solution described is used for completely different designs. For example, multiple contours that extend axially inwards can be provided on the plate. Other shapes of the fan housing than the helical shape shown are also possible.

The invention claimed is:

1. A fan comprising:
    a fan housing;
    a motor accommodated within the fan housing, the motor including a stator and a rotor; and
    a fan wheel accommodated in the fan housing; wherein
    the fan housing is formed of at least one housing upper part and a housing lower part;
    the housing upper part has an axial opening on an axial inner side facing the housing lower part; and
    electronics are disposed on an axial outer side of the opening.

2. The fan according to claim 1, wherein the electronics include motor control electronics or a unit of motor control electronics and adjoining electronics for supplying external consumers.

3. The fan according to claim 1, wherein the housing upper part forms part of an electronics housing.

4. The fan according to claim 2, wherein the motor control electronics are wirelessly connected to the stator through the axial opening of the housing upper part and can be detached from the stator.

5. The fan according to claim 1, wherein the stator comprises a connecting ring via which the stator can be attached axially and/or radially resting against a circumferential edge of the axial opening.

6. The fan according to claim 5, wherein the connecting ring comprises at least one circumferential step, thereby forming an axial contact surface and a radial contact surface on an edge of the axial opening and a support surface parallel to a radial extension of the axial opening on which the electronics are mounted directly.

7. The fan according to claim 1 wherein the housing upper part has a central section that is inwardly recessed in the axial direction having a pot shape and inside of which the axial opening is provided and the electronics are disposed.

8. The fan according to claim 7, wherein the electronics are completely accommodated in the axial and radial directions by the recessed central section.

9. The fan according to claim 7, wherein a plate is disposed on the housing upper part which covers at least the recessed central section and together with the housing upper part forms an electronics housing that encloses at least the electronics.

10. The fan according to claim 9, wherein at least sections of the plate have an axially embossed contour in a direction of the electronics which is thermally coupled to the electronics.

11. The fan according to claim 9, wherein the plate is made of metal.

12. The fan according to claim 1, wherein a seal disposed between the stator and the housing upper part, the seal hermetically separates the electronics from a medium delivered inside the fan housing.

13. The fan according to claim 1, wherein the housing upper part is designed in one piece.

14. The fan according to claim 9, wherein the electronics are disposed on a circuit board and a size ratio of a diameter B of the plate and a diameter D of the circuit board is determined as B/D >1.5.

15. The fan according to claim 14, wherein a size ratio of a diameter d of a connecting ring and a diameter D of the circuit board is determined as D>d.

* * * * *